(12) United States Patent
Mbariky et al.

(10) Patent No.: US 11,398,979 B2
(45) Date of Patent: Jul. 26, 2022

(54) DYNAMIC PROCESSING TREES

(71) Applicant: MELLANOX TECHNOLOGIES, LTD., Yokneam (IL)

(72) Inventors: Charlie Mbariky, Shfar'am (IL); Guy Twig, Bet Hillel (IL); Natali Shechtman, Givat Shmuel (IL); Amir Ancel, Moran (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 133 days.

(21) Appl. No.: 17/082,418

(22) Filed: Oct. 28, 2020

(65) Prior Publication Data

US 2022/0131794 A1 Apr. 28, 2022

(51) Int. Cl.
*H04L 12/24* (2006.01)
*H04L 45/48* (2022.01)
*H04L 45/00* (2022.01)
*H04L 45/745* (2022.01)
*H04L 49/9057* (2022.01)
(Continued)

(52) U.S. Cl.
CPC .............. *H04L 45/48* (2013.01); *H04L 45/38* (2013.01); *H04L 45/745* (2013.01); *H04L 47/2441* (2013.01); *H04L 47/34* (2013.01); *H04L 49/9057* (2013.01); *H04L 67/568* (2022.05)

(58) Field of Classification Search
CPC ....... H04L 45/38; H04L 45/48; H04L 45/745; H04L 47/2441; H04L 47/34; H04L 49/9057; H04L 67/2842
See application file for complete search history.

(56) References Cited

U.S. PATENT DOCUMENTS 4,751,648 A 6/1988 Sears, III et al.
5,901,291 A 5/1999 Feeney et al.
(Continued)

OTHER PUBLICATIONS

Leiserson, C E., "Fat-Trees: Universal Networks for Hardware Efficient Supercomputing", IEEE Transactions on Computers, vol. C-34, No. 10, pp. 892-901, Oct. 1985.
(Continued)

*Primary Examiner* — Phuc H Tran
(74) *Attorney, Agent, or Firm* — Kligler & Associates Patent Attorneys Ltd

(57) ABSTRACT

A method includes receiving a plurality of rules for processing packets arriving at at least one packet-processing device, the rules being based on multiple parameters associated with the packets. The method further includes causing the packet-processing device to process multiple subsets of the packets using different respective sequences of packet-processing instructions, which implement the rules via different respective parameter-value-ascertaining orders for ascertaining respective values of the parameters for each of the packets. The method further includes, based on the processing of the subsets, computing respective scores for the sequences of packet-processing instructions. The method further includes, based on the scores, selecting one of the sequences of packet-processing instructions. The method further includes causing the packet-processing device to process the packets using the selected sequence of packet-processing instructions. Other embodiments are also described.

30 Claims, 6 Drawing Sheets

(51) Int. Cl.
  *H04L 47/34* (2022.01)
  *H04L 47/2441* (2022.01)
  *H04L 67/568* (2022.01)

(56) References Cited

U.S. PATENT DOCUMENTS

| | | | |
|---|---|---|---|
| 5,961,659 A | 10/1999 | Benner | |
| 6,148,082 A | 11/2000 | Slattery et al. | |
| 6,335,930 B1 | 1/2002 | Lee | |
| 6,532,211 B1 | 3/2003 | Rathonyi et al. | |
| 6,775,268 B1 | 8/2004 | Wang et al. | |
| 6,804,532 B1 | 10/2004 | Moon et al. | |
| 6,980,555 B2* | 12/2005 | Mar | H04L 29/06 370/395.42 |
| 7,159,111 B1 | 1/2007 | Ganapathy | |
| 7,286,535 B2 | 10/2007 | Ishikawa et al. | |
| 7,415,012 B1* | 8/2008 | Mankins | H04L 43/028 370/389 |
| 7,539,772 B2 | 5/2009 | Herring et al. | |
| 7,675,876 B2 | 3/2010 | Foster et al. | |
| 7,746,854 B2 | 6/2010 | Ambe et al. | |
| 7,937,499 B1 | 5/2011 | Tripathi | |
| 8,051,212 B2 | 11/2011 | Kagan et al. | |
| 8,341,724 B1 | 12/2012 | Burns et al. | |
| 8,798,057 B1* | 8/2014 | Goel | H04L 45/745 370/392 |
| 8,804,747 B2* | 8/2014 | Galles | H04L 47/2441 370/399 |
| 9,014,006 B2 | 4/2015 | Haramaty et al. | |
| 9,390,056 B1 | 7/2016 | Noureddine et al. | |
| 9,397,960 B2 | 7/2016 | Arad et al. | |
| 10,015,090 B2 | 7/2018 | Arad et al. | |
| 10,454,991 B2 | 10/2019 | Bloch et al. | |
| 10,616,113 B2 | 4/2020 | Levy et al. | |
| 10,735,309 B2* | 8/2020 | Wu | H04L 45/22 |
| 2003/0041161 A1 | 2/2003 | Billings et al. | |
| 2003/0065812 A1 | 4/2003 | Beier et al. | |
| 2003/0065856 A1 | 4/2003 | Kagan et al. | |
| 2004/0267881 A1 | 12/2004 | Yao et al. | |
| 2005/0071473 A1 | 3/2005 | Rosenstock et al. | |
| 2005/0108518 A1 | 5/2005 | Pandya | |
| 2006/0227788 A1 | 10/2006 | Eldar et al. | |
| 2006/0280181 A1 | 12/2006 | Brailas et al. | |
| 2007/0005742 A1 | 1/2007 | Eldar et al. | |
| 2007/0058536 A1 | 3/2007 | Vaananen et al. | |
| 2007/0110081 A1 | 5/2007 | Miller | |
| 2007/0211741 A1 | 9/2007 | Kagan et al. | |
| 2008/0013549 A1 | 1/2008 | Okagawa et al. | |
| 2008/0022148 A1 | 1/2008 | Barnea et al. | |
| 2008/0080505 A1 | 4/2008 | Munoz | |
| 2008/0112415 A1 | 5/2008 | Sobaje | |
| 2008/0189432 A1 | 8/2008 | Abali et al. | |
| 2008/0205403 A1 | 8/2008 | Akyol et al. | |
| 2009/0077567 A1 | 3/2009 | Craddock et al. | |
| 2009/0119565 A1 | 5/2009 | Park et al. | |
| 2009/0141734 A1 | 6/2009 | Brown et al. | |
| 2009/0238181 A1 | 9/2009 | Desai et al. | |
| 2010/0039959 A1 | 2/2010 | Gilmartin | |
| 2010/0118875 A1 | 5/2010 | Lebizay et al. | |
| 2010/0220732 A1 | 9/2010 | Hussain et al. | |
| 2010/0232443 A1 | 9/2010 | Pandey | |
| 2010/0284404 A1 | 11/2010 | Gopinath et al. | |
| 2010/0290475 A1 | 11/2010 | Belanger et al. | |
| 2010/0315958 A1 | 12/2010 | Luo et al. | |
| 2011/0064084 A1 | 3/2011 | Tatar et al. | |
| 2011/0096668 A1 | 4/2011 | Bloch et al. | |
| 2011/0134753 A1 | 6/2011 | Kashyap | |
| 2012/0300669 A1 | 11/2012 | Zahavi | |
| 2012/0314706 A1 | 12/2012 | Liss | |
| 2013/0114599 A1 | 5/2013 | Arad et al. | |
| 2013/0151744 A1 | 6/2013 | Gupta et al. | |
| 2013/0315237 A1 | 11/2013 | Kagan et al. | |
| 2014/0185616 A1 | 7/2014 | Bloch et al. | |
| 2014/0254594 A1 | 9/2014 | Gasparakis et al. | |

OTHER PUBLICATIONS

Ohring et al., "On Generalized Fat Trees", Proceedings of the 9th International Symposium on Parallel Processing, pp. 37-44, Santa Barbara, USA, Apr. 25-28, 1995.

Zahavi, E., "D-Mod-K Routing Providing Non-Blocking Traffic for Shift Permutations on Real Life Fat Trees", CCIT Technical Report #776, Technion—Israel Institute of Technology, Haifa, Israel, Aug. 2010.

Yuan et al., "Oblivious Routing for Fat-Tree Based System Area Networks with Uncertain Traffic Demands", Proceedings of ACM SIGMETRICS—the International Conference on Measurement and Modeling of Computer Systems, pp. 337-348, San Diego, USA, Jun. 12-16, 2007.

Matsuoka S., "You Don't Really Need Big Fat Switches Anymore—Almost", IPSJ SIG Technical Reports, vol. 2003, No. 83, pp. 157-162, year 2003.

Kim et al., "Technology-Driven, Highly-Scalable Dragonfly Topology", 35th International Symposium on Computer Architecture, pp. 77-78, Beijing, China, Jun. 21-25, 2008.

Jiang et al., "Indirect Adaptive Routing on Large Scale Interconnection Networks", 36th International Symposium on Computer Architecture, pp. 220-231, Austin, USA, Jun. 20-24, 2009.

Minkenberg et al., "Adaptive Routing in Data Center Bridges", Proceedings of 17th IEEE Symposium on High Performance Interconnects, New York, USA, pp. 33-41, Aug. 25-27, 2009.

Kim et al., "Adaptive Routing in High-Radix Clos Network", Proceedings of the 2006 ACM/IEEE Conference on Supercomputing (SC2006), Tampa, USA, pp. 1-11, Nov. 2006.

Infiniband Trade Association, "InfiniBandTM Architecture Specification vol. 1", Release 1.2.1, pp. 1-1727, Nov. 2007.

Culley et al., "Marker PDU Aligned Framing for TCP Specification", IETF Network Working Group, RFC 5044, pp. 1-74, Oct. 2007.

Shah et al., "Direct Data Placement over Reliable Transports", IETF Network Working Group, RFC 5041, pp. 1-38, Oct. 2007.

Martinez et al., "Supporting fully adaptive routing in Infiniband networks", Proceedings of the International Parallel and Distributed Processing Symposium (IPDPS'03), Nice, France, pp. 1-10, Apr. 22-26, 2003.

Joseph, S., "Adaptive routing in distributed decentralized systems: NeuroGrid, Gnutella & Freenet", Proceedings of Workshop on Infrastructure for Agents, MAS and Scalable MAS, Montreal, Canada, pp. 1-11, year 2001.

Ding et al., "Level-wise scheduling algorithm for fat tree interconnection networks", Proceedings of the 2006 ACM/IEEE Conference on Supercomputing (SC 2006), pp. 1-9, Nov. 2006.

Gusat et al., "R3C2: Reactive Route & Rate Control for CEE", Proceedings of 18th IEEE Symposium on High Performance Interconnects, New York, USA, pp. 50-57, Aug. 10-27, 2010.

Wu et al., "DARD: Distributed adaptive routing datacenter networks", Proceedings of IEEE 32nd International Conference Distributed Computing Systems, pp. 32-41, Jun. 18-21, 2012.

Zimmerman et al., "Ethernet Switches", chapter 1, O'Reilly Media, Inc., pp. 1-29, year 2020 downloaded from https://www.oreilly.com/library/view/ethernet-switches/9781449367299/ch01.html.

Mellanox Technologies, "World-Class Performance Ethernet SmartNICs Product Line", Ethernet Brochure, pp. 1-8, year 2020.

* cited by examiner

DYNAMIC PROCESSING TREES

FIELD OF THE INVENTION

The present invention is related generally to communication over computer networks, and specifically to the processing of communication packets.

BACKGROUND

A network interface controller (NIC) is a unit that manages communication between a computer (e.g., a server) and a computer network, such as a local area network (LAN) or switch fabric. A NIC directs packets from the network to their respective destinations in the computer, for example by placing a packet in a buffer of a destination application in a memory unit of the computer. The NIC further directs outgoing packets, for example by sending a packet to the network or to a loopback port. The directing of a packet to its destination, which is generally referred to as "steering," includes ascertaining the destination of the packet and then forwarding the packet to its destination.

SUMMARY OF THE INVENTION

There is provided, in accordance with some embodiments of the present invention, a system including a memory and one or more processors configured to cooperatively carry out a process. The process includes receiving a plurality of rules for processing packets arriving at at least one packet-processing device, the rules being based on multiple parameters associated with the packets. The process further includes causing the packet-processing device to process multiple subsets of the packets using different respective sequences of packet-processing instructions, which are stored in the memory and implement the rules via different respective parameter-value-ascertaining orders for ascertaining respective values of the parameters for each of the packets. The process further includes, based on the processing of the subsets, computing respective scores for the sequences of packet-processing instructions. The process further includes, based on the scores, selecting one of the sequences of packet-processing instructions. The process further includes causing the packet-processing device to process the packets using the selected sequence of packet-processing instructions.

In some embodiments, the one or more processors include at least one Data Processing Unit (DPU) configured to carry out at least part of the process.

In some embodiments, at least one of the processors belongs to the packet-processing device.

In some embodiments, causing the packet-processing device to process the multiple subsets of the packets using the different respective sequences of packet-processing instructions includes iteratively performing a subprocess that includes, during each $i^{th}$ iteration of the subprocess:

while the packet-processing device is using a first one of the sequences of packet-processing instructions $S_1^i$, writing a second one of the sequences of packet-processing instructions $S_2^i$ to the memory, and subsequently to writing $S_2^i$ to the memory, causing the packet-processing device to use $S_2^i$ instead of $S_1^i$.

In some embodiments, the subprocess further includes, during each $i^{th}$ iteration of the subprocess:

comparing the score for $S_2^i$ to the score for $S_1^i$, and based on the comparing, selecting either $S_1^i$ or $S_2^i$ as the first one of the sequences of packet-processing instructions, $S_1^{i+1}$, for a next iteration of the subprocess.

In some embodiments, causing the packet-processing device to process the multiple subsets of the packets using the different respective sequences of packet-processing instructions includes causing the packet-processing device to process the multiple subsets of the packets using the different respective sequences of packet-processing instructions by:

initializing a batch of N of the parameter-value-ascertaining orders, and iteratively:

causing the packet-processing device to use N of the sequences of packet-processing instructions that implement the rules via the N parameter-value-ascertaining orders in the batch, respectively, based on the respective scores for the N sequences of packet-processing instructions, removing, from the batch, all but T of the N parameter-value-ascertaining orders, deriving N-T of the parameter-value-ascertaining orders from the T parameter-value-ascertaining orders remaining in the batch, and adding the derived parameter-value-ascertaining orders to the batch.

In some embodiments, deriving the N-T parameter-value-ascertaining orders includes deriving at least one of the N-T parameter-value-ascertaining orders by combining part of a first one of the T parameter-value-ascertaining orders with another part of a second one of the T parameter-value-ascertaining orders.

In some embodiments, deriving the N-T parameter-value-ascertaining orders includes deriving at least one of the N-T parameter-value-ascertaining orders by swapping respective positions of two of the parameters in one of the T parameter-value-ascertaining orders.

In some embodiments, the score for each of the sequences of packet-processing instructions is based on a number of the packets processed per unit time using the sequence.

In some embodiments, the score for each of the sequences of packet-processing instructions is based on an average number, per packet, of lookups in the sequence when using the sequence.

In some embodiments, the score for each of the sequences of packet-processing instructions is based on an average number, per packet, of cache hits or cache misses when using the sequence.

In some embodiments, the score for each of the sequences of packet-processing instructions is based on a number of memory entries that store the sequence.

There is further provided, in accordance with some embodiments of the present invention, a method including receiving a plurality of rules for processing packets arriving at at least one packet-processing device, the rules being based on multiple parameters associated with the packets. The method further includes causing the packet-processing device to process multiple subsets of the packets using different respective sequences of packet-processing instructions, which implement the rules via different respective parameter-value-ascertaining orders for ascertaining respective values of the parameters for each of the packets. The method further includes, based on the processing of the subsets, computing respective scores for the sequences of packet-processing instructions. The method further includes, based on the scores, selecting one of the sequences of packet-processing instructions. The method further includes causing the packet-processing device to process the packets using the selected sequence of packet-processing instructions.

The present invention will be more fully understood from the following detailed description of embodiments thereof, taken together with the drawings, in which:

DETAILED DESCRIPTION OF EMBODIMENTS

Overview

A packet-processing device, such as a NIC, processes packets in accordance with rules that are based on parameters associated with the packets. For example, the rules may include specific instructions for modifying and/or forwarding a packet in the event that the header of the packet includes a specific source or destination address.

When implementing rules based on a small number of parameters, the parameter-value-ascertaining order in which the device ascertains the values of the parameters may be relatively unimportant. However, when implementing rules based on a larger number of parameters, the rate at which the packets are processed, the amount of memory consumption, and/or other factors may depend substantially on the parameter-value-ascertaining order, such that choosing a suboptimal parameter-value-ascertaining order may compromise the performance of the device.

To address this challenge, embodiments of the present invention cause the packet-processing device to try various parameter-value-ascertaining orders. For each parameter-value-ascertaining order, a score, which is based on metrics such as the number of packets processed per unit time, is computed. The parameter-value-ascertaining order having the highest score is then selected for use in future processing.

In many cases, the number of parameters is too large to allow trying every possible parameter-value-ascertaining order. For example, a typical set of rules may be based on 20 parameters, and hence may be implemented via 20! different parameter-value-ascertaining orders. Embodiments of the present invention therefore provide an efficient trial technique that allows the top-scoring parameter-value-ascertaining orders to "evolve" via score-boosting changes. Upon convergence of the highest score, the trial is terminated.

In the context of the present application, including the claims, the processing of a packet may include any suitable operation, including modifying, steering, or dropping the packet.

System Description

Figure 1:
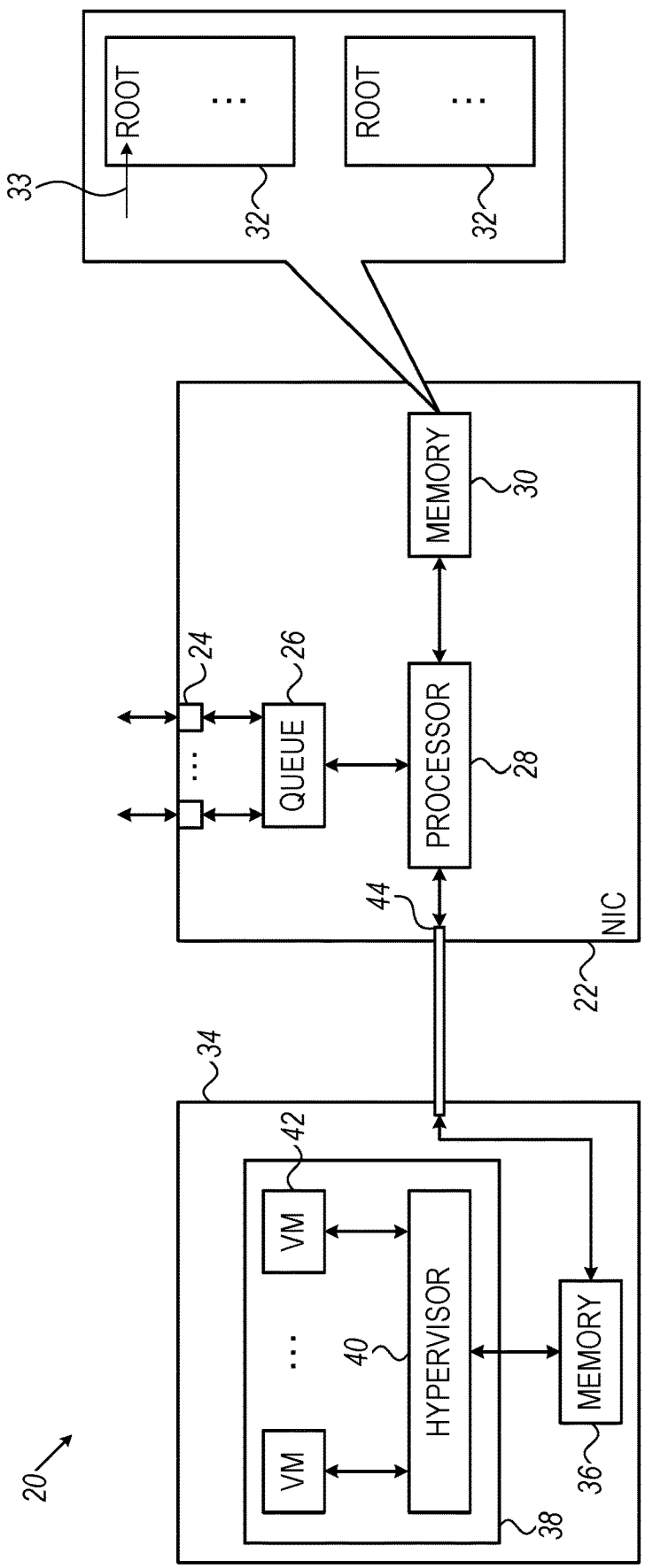
FIG. 1 is a schematic illustration of a computer system, in accordance with some embodiments of the present invention.

Reference is initially made to FIG. 1, which is a schematic illustration of a computer system 20, in accordance with some embodiments of the present invention.

System 20 comprises a computer 34, comprising a processor 38 and a memory 36, comprising, for example, a random access memory (RAM). Processor 38 is configured to execute multiple processes on computer 34. In some embodiments, these processes are executed on a plurality of virtual machines (VMs) 42, which are managed by a hypervisor 40 or other virtualization software. Alternatively or additionally, the processes may be executed on multiple cores belonging to processor 38.

System 20 further comprises a packet-processing device 22, configured to process incoming packets, e.g., by steering these packets to computer 34, and/or to process outgoing packets, e.g., by steering these packets from computer 34. Packet-processing device 22 may be connected to computer 34 over any suitable communication interface 44, such as a Peripheral Component Interconnect (PCI). In some embodiments, packet-processing device 22 comprises a network interface controller (NIC), comprising, for example, an InfiniBand host channel adapter (HCA) or a host bus adapter (HBA). Alternatively, packet-processing device 22 may comprise a network switch. Alternatively, the packet-processing device may comprise any computer configured to process packets by executing suitable software instructions.

Packet-processing device 22 comprises ports 24, which may comprise, for example, at least one InfiniBand port, Ethernet port, and/or loopback port. Packet-processing device 22 further comprises a queue 26, configured to store incoming packets received at ports 24 and/or outgoing packets destined for ports 24. A processor 28 of the packet-processing device retrieves incoming packets from, and stores outgoing packets in, queue 26.

Packet-processing device 22 further comprises a memory 30, comprising, for example, a RAM. In some embodiments, memory 30 is configured to store one or more sequences 32 of packet-processing instructions, which may implement the same set of packet-processing rules in different ways, as further described below with reference to FIG. 2.

Subsequently to retrieving an incoming packet from the queue, processor 28 processes the packet in accordance with the packet-processing rules implemented by sequences 32. Thus, for example, by following the instructions contained in one of the sequences, the processor may ascertain that the packet is destined for a particular process running on computer 34, and then store the packet (typically via direct memory access (DMA) over communication interface 44) in a buffer in memory 36 used by the process. Similarly, based on one of sequences 32, the processor may steer each outgoing packet (via queue 26) to the appropriate port 24, such that the packet is communicated to its destination.

Typically, for embodiments in which multiple sequences of packet-processing instructions are stored simultaneously in memory 30, memory 30 further stores a pointer 33, which points to the first (or "root") memory entry in the sequence that is currently in use.

In other embodiments, sequences 32 (and, typically, pointer 33) are stored in memory 36, rather than memory 30. In such embodiments, processor 28 typically accesses sequences 32 via DMA over communication interface 44. The sequences may be stored in memory 36 by processor 38 (e.g., by hypervisor 40) or by processor 28, typically via DMA over communication interface 44.

Typically, packet-processing device 22 further comprises a cache memory (not shown), configured to store packet-processing instructions from sequences 32. When attempting to read any particular packet-processing instruction, processor 28 first checks whether the instruction is stored in the cache. If yes—i.e., if the processor experiences a cache hit—the processor reads the instruction from the cache. Otherwise—i.e., if the processor experiences a cache miss—the processor reads the instruction from memory 30 or memory 36.

The Sequences of Packet-Processing Instructions

Figure 2:
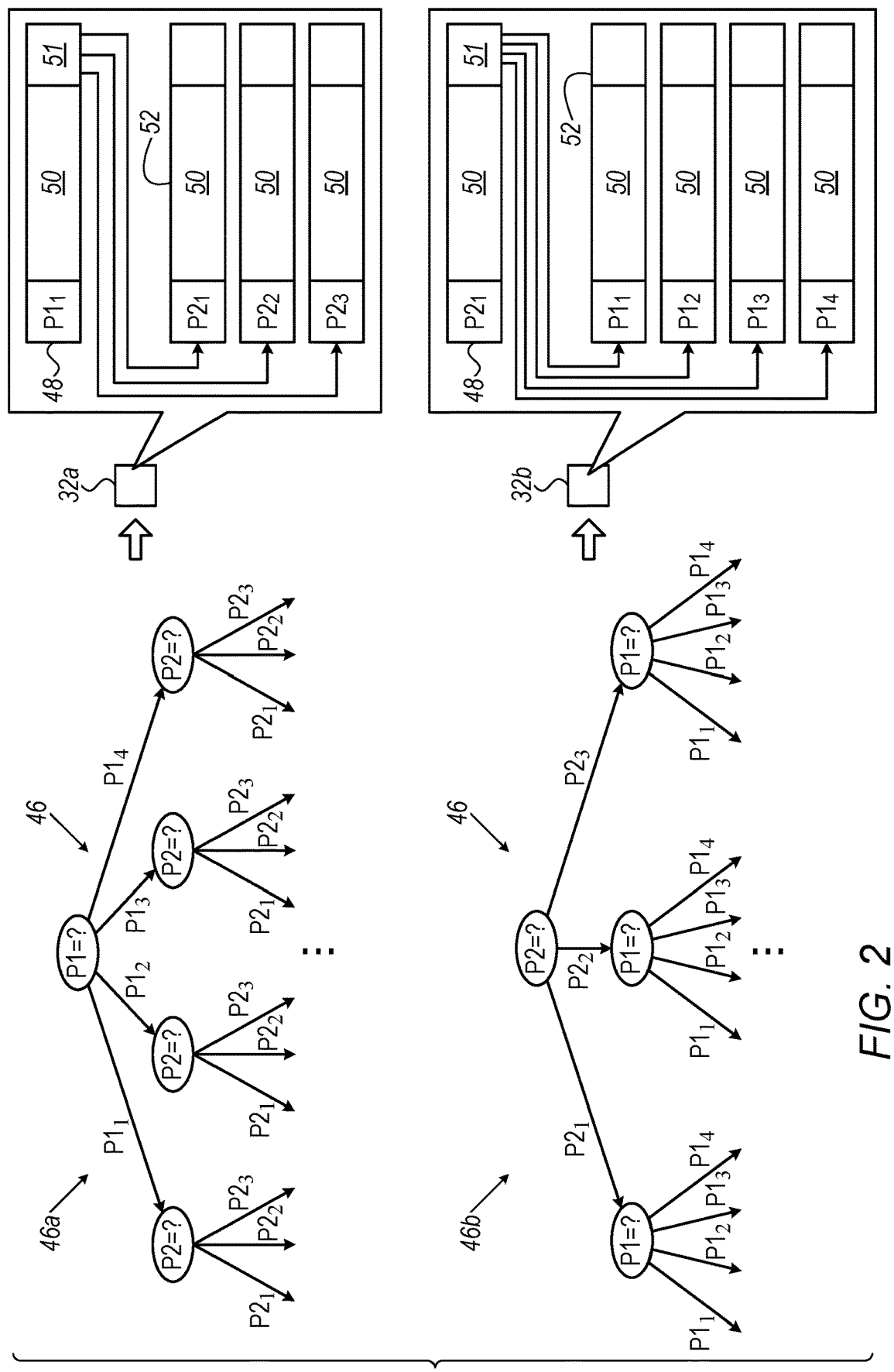
FIG. 2 is a schematic illustration of two different sequences of packet-processing instructions, in accordance with some embodiments of the present invention.

For further details regarding sequences 32, reference is now additionally made to FIG. 2, which is a schematic illustration of two different sequences of packet-processing instructions, in accordance with some embodiments of the present invention.

As noted above, each sequence 32 contains instructions for steering and/or otherwise processing packets arriving at packet-processing device 22. The instructions are based on multiple parameters associated with the packets, such that two packets that differ from one another with respect to at least one of the parameters may be processed differently from one another. The parameters may include one or more fields contained in the headers of the packets, such as a layer-2, layer-3, or layer-4 source address or destination address (e.g., a source or destination Internet Protocol (IP) or media access control (MAC) address), or a Virtual Extensible Local Area Network (VXLAN) network identifier (VNI). Alternatively or additionally, the parameters may include one or more properties, such as the size, of the packets. Alternatively or additionally, one or more of the parameters may describe the manner in which the packets are communicated, such that, for example, packets received at different respective ports 24 are processed differently from one another.

Although multiple sequences 32 may implement the same rules, the sequences may differ from each other with respect to the parameter-value-ascertaining order in which the parameters are processed for each of the packets.

By way of illustration, FIG. 2 shows two decision trees 46, which implement a hypothetical set of rules in accordance with different respective parameter-value-ascertaining orders. In particular:

(i) Per a first decision tree 46a, processor 28 ascertains the value of a first parameter P1 before ascertaining the value of a second parameter P2. The parameter-value-ascertaining order implemented by first decision tree 46a may thus be written as {P1, P2, . . . }.

First decision tree 46a corresponds to a first sequence 32a of packet-processing instructions. When using first sequence 32a to process any given packet, processor 28 first ascertains the value of P1 for the packet, per the root entry in first sequence 32a. Subsequently, the processor looks up, in first sequence 32a, another memory entry 48 corresponding to the value of P1. (FIG. 2 shows entry 48 for a first value, or range or group of values, $P1_1$.) Subsequently, the processor executes any processing instructions 50, such as instructions for modifying or forwarding the packet, stored in entry 48. Next, the processor reads, from the entry, lookup instructions 51, which include the address of a subsequent entry 52 corresponding to the value of P2 for the packet. The processor then looks up the subsequent entry. (FIG. 2 shows entry 52 for each of the values, or ranges or groups of values, $P2_1$, $P2_2$, and $P2_3$.) In this manner, the processor traverses the memory entries in sequence 32a.

(ii) Per a second decision tree 46b, the processor ascertains the value of P2 before doing so for P1. The parameter-value-ascertaining order implemented by second decision tree 46b may thus be written as {P2, P1, . . . }.

Second decision tree 46b corresponds to a second sequence 32b of packet-processing instructions. When using second sequence 32b to process any given packet, processor 28 first ascertains the value of P2 for the packet, per the root entry in second sequence 32b. Subsequently, the processor looks up, in second sequence 32b, the memory entry corresponding to the value of P2. (FIG. 2 shows this entry for $P2_1$.) Subsequently, after executing any processing instructions 50 stored in the entry, the processor reads, from lookup instructions 51 of the entry, the address of the subsequent memory entry corresponding to the value of P1 for the packet, and then looks up the subsequent entry. In this manner, the processor traverses sequence 32b.

Sequences having different respective parameter-value-ascertaining orders may have different respective numbers of memory entries, and hence, may occupy different respective amounts of memory. For example, the portion of first decision tree 46a shown in FIG. 2 corresponds to 16 memory entries in first sequence 32a (in addition to the root entry): four entries corresponding, respectively, to the four possible values (or ranges or sets of values) $P1_1$, $P1_2$, $P1_3$, and $P1_4$ of P1, and another twelve entries for P2, including four entries corresponding to $P2_1$, four entries corresponding to $P2_2$, four entries corresponding to $P2_3$, and four entries corresponding to $P2_4$. On the other hand, the portion of second decision tree 46b shown in FIG. 2 corresponds to only 15 memory entries in second sequence 32b: three entries corresponding, respectively, to $P2_1$, $P2_2$, and $P2_3$, and another twelve entries for P1.

Moreover, by virtue of the different parameter-value-ascertaining orders, one sequence may facilitate faster and/or more effective processing than another sequence.

Hence, embodiments of the present invention provide techniques for causing the packet-processing device to process multiple subsets of packets using different respective sequences of instructions, which implement the rules via different respective parameter-value-ascertaining orders. Based on the processing of the subsets, respective scores are computed for the sequences of instructions, the score for each sequence being based on, for example, the number of memory entries that store the sequence and/or a normalized number of packets processed per unit time using the sequence. Based on the scores, one of the sequences of instructions (typically, the sequence having the highest score) is identified as the optimal sequence, and is therefore selected for future use.

In some embodiments, these techniques are performed by processor 38 (e.g., by hypervisor 40), typically by executing software. In particular, for each parameter-value-ascertaining order that is to be used, processor 38 writes, to memory 36, the sequence of instructions implementing the rules in accordance with the parameter-value-ascertaining order. Processor 38 further modifies pointer 33 so as to cause the packet-processing device to use each new sequence of instructions written to the memory.

In other embodiments, these techniques are performed by processor 28, typically by executing firmware. In particular, for each parameter-value-ascertaining order that is to be used, processor 28 writes, to memory 30 or memory 36, the sequence of instructions implementing the rules in accordance with the parameter-value-ascertaining order, and modifies pointer 33 accordingly.

In yet other embodiments, these techniques are performed cooperatively by processor 28 and processor 38. For example, for each parameter-value-ascertaining order, processor 38 may write a decision tree 46 implementing the order to memory 36. Subsequently, processor 28 may read the decision tree from memory 36, and then write, to memory 30 or memory 36, the sequence of instructions corresponding to the decision tree.

(It is noted that a node in the decision tree may correspond to a set of multiple parameters, such that edges diverging from the node may correspond to different respective sets of parameter values. For example, one edge may correspond to the set of values $\{P1_2, P1_1\}$, while another edge may correspond to $\{P1_1, P2_2\}$. In contrast, each memory entry generally corresponds to a single parameter value.)

In some embodiments, system 20 comprises multiple packet-processing devices configured to use, simultaneously, different respective sequences of instructions implementing the same packet-processing rules. Advantageously, such embodiments may facilitate a faster identification of an optimal sequence of packet-processing instructions.

In such embodiments, the respective processors of the packet-processing devices may be cooperatively networked, such that the processors cooperatively perform the techniques described herein. Thus, for example, the processors may cooperatively compute multiple parameter-value-ascertaining orders and assign a different respective subset of the parameter-value-ascertaining orders to each of the processors, such that each processor writes to memory, and uses, a different respective group of sequences of packet-processing instructions.

Alternatively, in such embodiments, the computation of the parameter-value-ascertaining orders, the assignment of the parameter-value-ascertaining orders to the processors of the packet-processing devices, and, optionally, the writing of the sequences of packet-processing instructions to memory may be performed by processor 38 or by multiple, cooperatively-networked processors of different respective computers 34. In the latter case, each packet-processing device may be connected to a different respective computer 34. The cooperatively-networked processors may use the Message Passing Interface (MPI), or any other suitable communication protocol, to communicate with each other.

In some embodiments, the functionality of processor 38, as described herein, is implemented solely in hardware, e.g., using one or more fixed-function or general-purpose integrated circuits, Application-Specific Integrated Circuits (ASICs), and/or Field-Programmable Gate Arrays (FPGAs). Typically, however, the functionality of processor 38 is implemented at least partly in software. For example, in some embodiments, processor 38 is embodied as a programmed processor comprising, for example, a central processing unit (CPU) and/or at least one other unit such as a Graphics Processing Unit (GPU) (e.g., an integrated GPU (iGPU)), a Data Processing Unit (DPU), or an Ethernet network adapter card. Program code, including software programs, and/or data may be loaded for execution and processing by the CPU and/or any of the other units listed above. The program code and/or data may be downloaded to the processor in electronic form, over a network, for example. Alternatively or additionally, the program code and/or data may be provided and/or stored on non-transitory tangible media, such as magnetic, optical, or electronic memory. Such program code and/or data, when provided to the processor, produce a machine or special-purpose computer, configured to perform the tasks described herein.

In some embodiments, the functionality of processor 28, as described herein, is implemented solely in hardware, e.g., using one or more fixed-function or general-purpose integrated circuits, ASICs, and/or FPGAs. Typically, however, the functionality of processor 28 is implemented at least partly in firmware and/or higher-level software. For example, in some embodiments, processor 28 is embodied as a programmed processor comprising, for example, a CPU and/or at least one other unit such as a GPU (e.g., an iGPU) or a DPU. Program code, including software programs, and/or data are loaded for execution and processing by the CPU and/or any of the other units listed above. The program code and/or data may be downloaded to the processor in electronic form, over a network, for example. Alternatively or additionally, the program code and/or data may be provided and/or stored on non-transitory tangible media, such as magnetic, optical, or electronic memory. Such program code and/or data, when provided to the processor, produce a machine or special-purpose computer, configured to perform the tasks described herein.

Finding the Optimal Sequence of Packet-Processing Instructions

Figure 3:
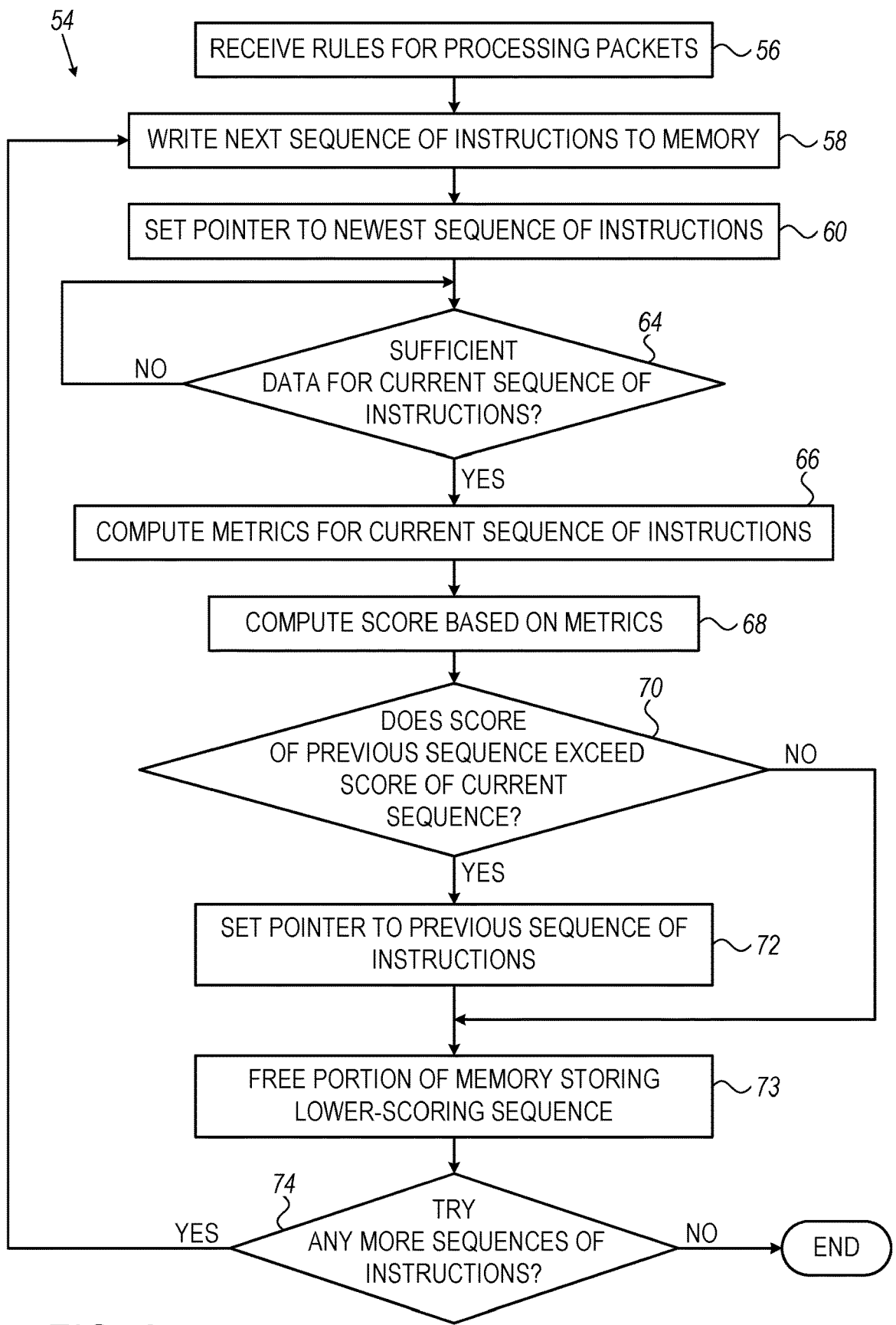
FIGS. 3-4 are flow diagrams for example algorithms for finding an optimal sequence of packet-processing instructions, in accordance with some embodiments of the present invention.

Reference is now made to FIG. 3, which is a flow diagram for an example algorithm 54 for finding an optimal sequence of packet-processing instructions, in accordance with some embodiments of the present invention. As described above with reference to FIGS. 1-2, algorithm 54 may be executed by processor 28 and/or processor 38, referred to below simply as "the processor."

Algorithm 54 begins with a rule-receiving step 56, at which the processor receives a plurality of rules for processing packets arriving at the packet-processing device. The rules may be received directly from a user (e.g., a network administrator) via a suitable user interface, or loaded from a storage device, such as a hard drive or flash drive.

Subsequently to receiving the rules, the processor begins an iterative process. During each $i^{th}$ iteration of the process, the processor, at a writing step 58, writes a new sequence of instructions $S_2^i$ to memory 30 or memory 36 (FIG. 1) while the packet-processing device is using the current sequence $S_1^i$. ($S_2^i$ differs from $S_1^i$ by virtue of implementing the rules via a different parameter-value-ascertaining order.) Subsequently to writing $S_2^i$ to the memory, the processor causes the packet-processing device to use $S_2^i$ instead of $S_1^i$ (i.e., the processor makes $S_2^i$ the current sequence), typically by setting pointer 33 (FIG. 1) to (the root of) $S_2^i$ at a pointer-setting step 60.

While the packet-processing device uses $S_2^i$, the processor collects data relating to the processing, e.g., by counting the number of processed packets and/or the number of lookups in the sequence of instructions. The processor also continually checks, at a first checking step 64, whether sufficient data have been obtained for $S_2^i$. For example, the processor may ascertain whether $S_2^i$ has been used for at least a predefined threshold amount of time, and/or whether a predefined threshold number of packets have been processed using $S_2^i$.

Upon ascertaining that sufficient data have been obtained, the processor, at a metric-computing step 66, computes one or more metrics for $S_2^i$. Typically, the metrics include one or more of:

(i) a metric based on a number of packets processed per unit time (e.g., per second) using the sequence, such as the metrics $R/R_{MAX}$ and $T/T_{MAX}$ defined below;

(ii) an average number, per packet, of lookups in the sequence when using the sequence;

(iii) an average number, per packet, of cache hits or cache misses when using the sequence; and (iv) a metric based on a number of entries that store the sequence, such as the ratio Q defined below. (It is noted that this metric may be calculated even before sufficient data are obtained, such as during or immediately subsequently to the writing of the sequence of instructions.)

Subsequently to computing the metrics, the processor, at a score-computing step 68, computes a score based on the metrics. For example, the score may equal $(R/R_{MAX} \times T/T_{MAX})/(L_R \times L_T \times C \times Q)$, where:

(a) R is the number of received (incoming) packets processed per unit time;

(b) $R_{MAX}$ is the hypothetical maximum number of received packets that may be processed per unit time, which may be computed based on the clock rate of the processor;

(c) T is the number of transmitted (outgoing) packets processed per unit time;

(d) $T_{MAX}$ is the hypothetical maximum number of transmitted packets that may be processed per unit time, which may be computed as described above for $R_{MAX}$;

(e) $L_R$ is the average number of lookups (or "hops") per received packet;

(f) $L_T$ is the average number of lookups per transmitted packet;

(g) C is the average number of cache misses per packet; and (h) Q is the ratio of the number of memory entries storing the sequence of instructions to the number of nodes in the corresponding decision tree. (Normalizing the number of memory entries by the number of nodes facilitates comparing two sequences of packet-processing instructions to one another in the event that the packet-processing rules were modified after using the first sequence but before using the second sequence.)

Alternatively, the score may combine the metrics in any other suitable way, assigning any suitable weight to each metric. For embodiments in which a single metric (such as Q) is computed, the score may equal the metric.

Typically, the score is defined such that a higher score is indicative of better performance, and hence, the optimal sequence of instructions has the highest score, as in the case of the example above and as assumed below. Alternatively, the opposite convention may be used, such that the optimal sequence of instructions has the lowest score. For example, the score may equal $(L_R \times L_T \times C \times Q)/(R/R_{MAX} \times T/T_{MAX})$, which is the inverse of the expression above.

Subsequently to computing the score, the processor, at a score-comparing step 70, compares the score for $S_2^i$ with the score for $S_1^i$ (the previous sequence of instructions). If the score for $S_1^i$ exceeds the score for $S_2^i$, the processor causes the packet-processing device to use $S_1^i$ again, typically by setting the pointer to $S_1^i$ at a pointer-reverting step 72. The processor thus selects $S_1^i$ as $S_1^{i+1}$ for the next iteration of the process, i.e., the processor lets $S_1^{i+1}=S_1^i$. Otherwise, the processor allows the packet-processing device to continue using $S_2^i$ thus effectively selecting $S_2^i$ as $S_1^{i+1}$ for the next iteration.

Subsequently to selecting one of the sequences, the processor, at a memory-freeing step 73, frees the portion of the memory storing the lower-scoring (and hence unselected) sequence. In other words, if $S_1^{i+1}=S_1^i$, the processor frees the portion of the memory storing $S_2^i$; otherwise, the processor frees the portion of the memory storing $S_1^i$.

Next, the processor checks, at a second checking step 74, whether any more sequences of instructions should be tried. For example, as further described below with reference to FIG. 5, each sequence of instructions written to the memory at writing step 58 may implement the rules via a different respective parameter-value-ascertaining order computed by another algorithm running in parallel to algorithm 54. The processor may therefore check, at second checking step 74, whether the other algorithm has provided any more parameter-value-ascertaining orders.

If the processor ascertains that at least one more sequence of instructions should be tried, the processor returns to writing step 58, thus beginning the next iteration of the iterative process. Otherwise, algorithm 54 ends, with the packet-processing device using the optimal sequence of packet-processing instructions. (It is noted that this sequence is "optimal" only relative to the other sequences of instructions that were tried; another sequence of instructions, with an even higher score, may not have been tried.)

It is noted that during most of the performance of algorithm 54, the memory stores two sequences of instructions: the sequence currently in use, and the current optimal sequence.

Figure 4:
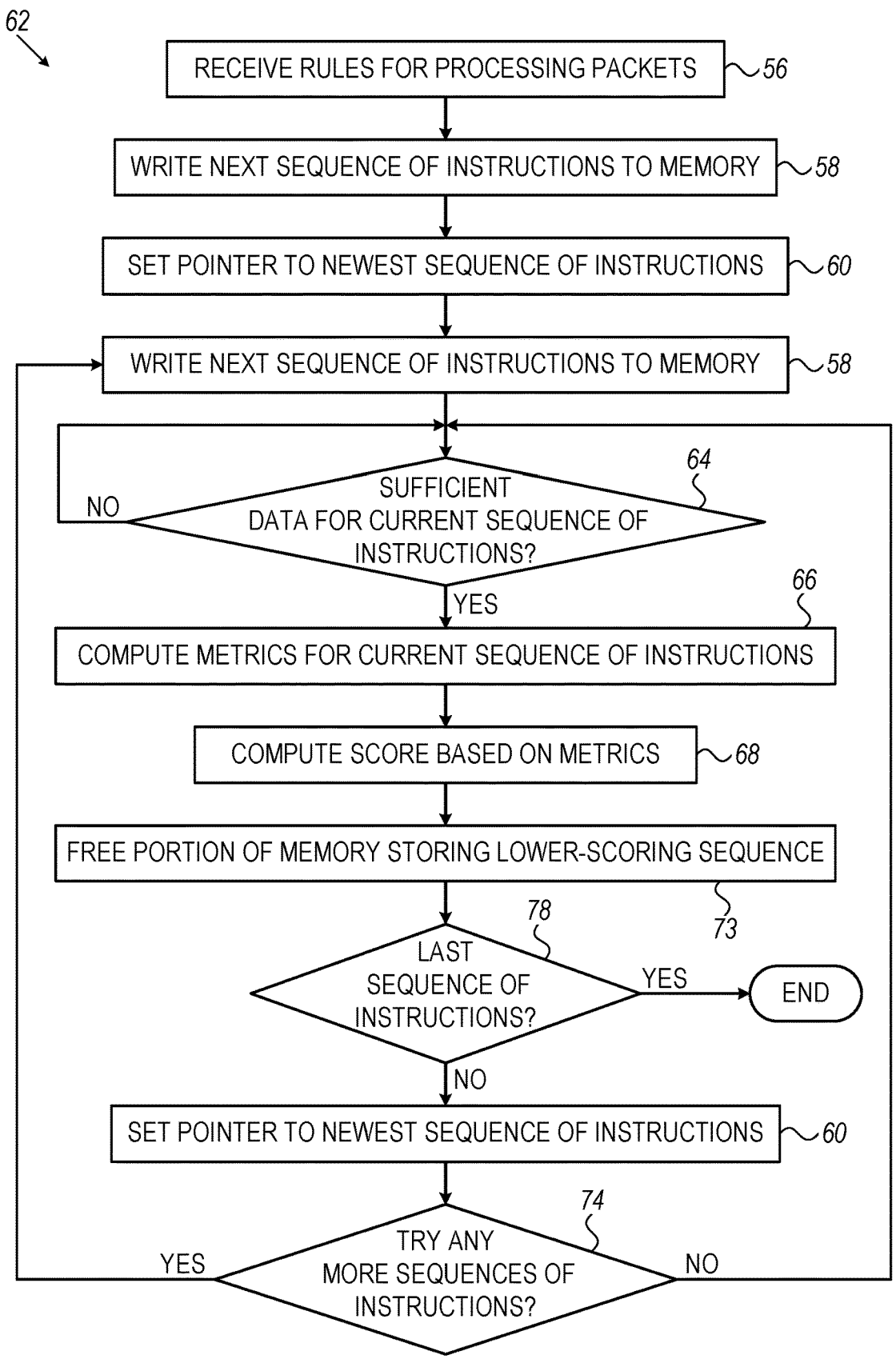

Reference is now made to FIG. 4, which is a flow diagram for another example algorithm 62 for finding an optimal sequence of packet-processing instructions, in accordance with some embodiments of the present invention. Algorithm 62 may be executed alternatively to algorithm 54 (FIG. 3). During most of the performance of algorithm 62, the memory stores three sequences of packet-processing instructions: the sequence currently in use, the current optimal sequence $S_O$, and the upcoming sequence.

Per algorithm 62, following the receipt of the rules at rule-receiving step 56, the processor performs writing step 58, thus writing a first sequence of instructions to memory. Subsequently, the processor causes the packet-processing device to use the first sequence by performing pointer-setting step 60.

Subsequently, the processor begins an iterative process. Similarly to algorithm 54, during each $i^{th}$ iteration of the process, the processor, at writing step 58, writes a new sequence $S_2^i$ of instructions to memory while the packet-processing device is using the current sequence $S_1^i$. However, in the case of algorithm 62, $S_2^i$ is written to memory before the score is computed for $S_1^i$. Subsequently to computing the score for $S_1^i$, the processor performs memory-freeing step 73. In particular, if the score for $S_1^i$ does not exceed that of $S_O$, the processor frees the portion of the memory storing $S_1^i$; otherwise, the processor frees the portion of the memory storing $S_O$, and $S_1^i$ is designated as the new optimal sequence $S_O$.

Subsequently, the processor checks, at a third checking step 78, whether the current sequence of instructions is the last sequence to be tried. If yes, the algorithm ends, with the packet-processing device using $S_O$. Otherwise, the processor causes the packet-processing device to use $S_2^i$, typically by setting the pointer to $S_2^i$ at pointer-setting step 60. (In other words, $S_1^{i+1}$ is set to $S_2^i$) The processor then performs second checking step 74. If at least one more sequence of instructions is to be tried, the processor returns to writing step 58, thus beginning the next iteration of the iterative process. Otherwise, the processor returns to first checking step 64.

Optionally, in the event that queue 26 (FIG. 1) contains a large number of packets at the end of an iteration (due to poor performance of the current sequence), the processor may cause the packet-processing device to use $S_O$ to clear the backlog in the queue, prior to the packet-processing device using the newest sequence of instructions.

In general, the processor is configured to modify each sequence of instructions stored in memory so as to implement any changes to the rules that occur while algorithm 54, algorithm 62, or any other trial algorithm for finding an optimal sequence of instructions is being executed. For example, in the case of algorithm 54, each of $S_1^i$ and $S_2^i$ is modified. In the case of algorithm 62, each of $S_1^i$, $S_2^i$, and $S_O$ is modified.

In some embodiments, as the processor performs writing step 58, the processor counts the number of entries written to memory. If the number of entries exceeds a threshold, such as a number that is 5%-15% greater than (i) the number of memory entries in the previous sequence of instructions that was tried, or (ii) the smallest number of memory entries in any sequence of instructions tried thus far, the processor aborts the writing, and instead writes another sequence of instructions to memory.

In general, a trial algorithm for finding an optimal sequence of instructions, such as algorithm 54 or algorithm 62, may be executed at any suitable intervals. For example, the algorithm may be executed periodically, e.g., once per day. Alternatively or additionally, the algorithm may be executed in response to accumulated changes in the rules for processing the packets. For example, the processor may count the number of rules that have been added, removed, or modified since the last execution of the algorithm. In response to this count exceeding a predefined threshold, the processor may execute the algorithm. Alternatively or additionally, while using the optimal sequence, the processor may continue to track the score. In response to a deterioration in the score that passes a predefined threshold, the processor may execute the algorithm.

Computing the Parameter-Value-Ascertaining Orders

Figure 5:
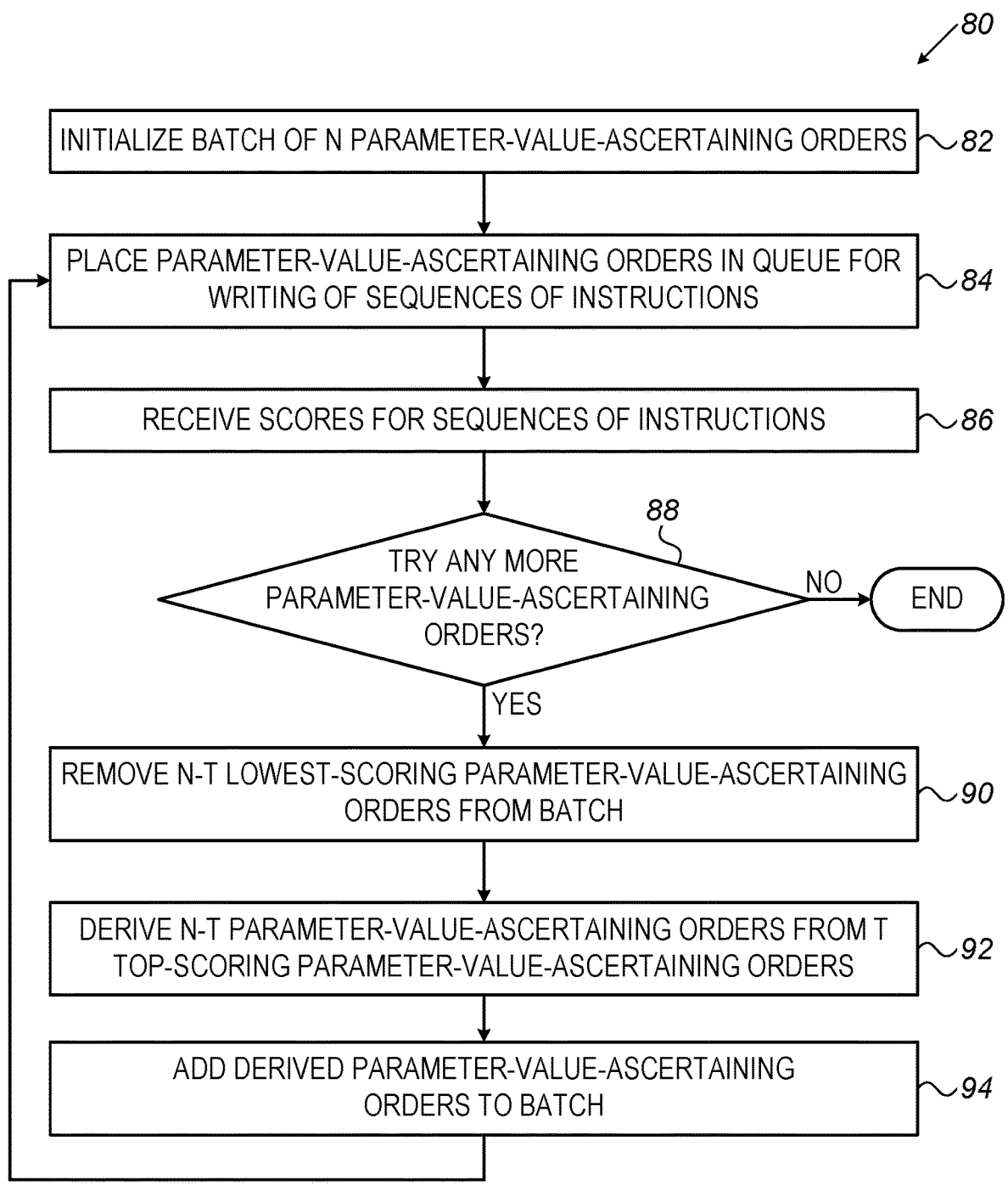
FIG. 5 is a flow diagram for an example algorithm for computing parameter-value-ascertaining orders, in accordance with some embodiments of the present invention.

The various sequences of packet-processing instructions written to memory at writing step 58 differ from each other by virtue of implementing the packet-processing rules via different respective parameter-value-ascertaining orders. In general, any suitable algorithm may be used to compute these parameter-value-ascertaining orders. A flow diagram of one such example algorithm 80 is shown in FIG. 5, to which reference is now made. Algorithm 80 may be executed by the processor in parallel to algorithm 54 (FIG. 3), algorithm 62 (FIG. 4), or any other trial algorithm.

Algorithm 80 begins at a batch-initializing step 82, at which the processor initializes a batch of N parameter-value-ascertaining orders, N typically being between 5 and 25. Typically, one of the N parameter-value-ascertaining orders is the current optimal parameter-value-ascertaining order, and the processor computes each of the other parameter-value-ascertaining orders by randomly ordering the set of parameters on which the rules are based.

Subsequently to initializing the batch, the processor begins an iterative process. In each iteration of this process, the processor causes the packet-processing device to use N sequences of instructions that implement the rules via the N parameter-value-ascertaining orders in the batch, respectively. Subsequently, based on the respective scores for the N sequences of instructions, the processor removes, from the batch, all but T of the N parameter-value-ascertaining orders, T typically being between 0.1N and 0.3N. Next, the processor derives N-T parameter-value-ascertaining orders from the T parameter-value-ascertaining orders remaining in the batch, and then adds the derived parameter-value-ascertaining orders to the batch.

More specifically, to cause the packet-processing device to use the N sequences of instructions, the processor typically places the parameter-value-ascertaining orders in a queue at a placing step 84. (To avoid any confusion, it is noted that this queue is different from queue 26 shown in FIG. 1.) Subsequently, each time a sequence of instructions is to be written to memory (e.g., each time that writing step 58 of FIGS. 3-4 is performed), the processor retrieves the parameter-value-ascertaining order from the head of the queue, and then writes the sequence of instructions so as to implement the rules via the retrieved parameter-value-ascertaining order.

For example, referring again to FIG. 2, the processor may place the parameter-value-ascertaining orders {P1, P2, . . . } and {P2, P1, . . . } in the queue. Subsequently (e.g., during the performance of writing step 58), the processor may retrieve {P1, P2, . . . } from the queue, and then write first sequence 32a so as to implement the rules via this parameter-value-ascertaining order. The processor may then retrieve {P2, P1, . . . } from the queue, and write second sequence 32b.

Following the trial of all N sequences of instructions, the processor receives the respective scores for the sequences at a score-receiving step 86. Subsequently, based on the scores, the processor checks, at a fourth checking step 88, whether any more parameter-value-ascertaining orders should be tried. If yes, the processor proceeds to a removing step 90, as further described below. Otherwise, the algorithm ends.

For example, at fourth checking step 88, the processor may check whether the highest received score has increased over the past k iterations by more than a predefined threshold. In other words, using the notation $H^i$ to indicate the highest score received during the $i^{th}$ iteration, the processor may check whether $H^i$ differs from $H^{i-k}$ by more than a predefined threshold. If not, the algorithm ends; otherwise, the processor proceeds to removing step 90.

At removing step 90, the processor removes the N-T lowest-scoring parameter-value-ascertaining orders from the batch. Subsequently, at a deriving step 92, the processor derives N-T parameter-value-ascertaining orders from the T top-scoring parameter-value-ascertaining orders remaining in the batch, as further described below. Next, at a batch-filling step 94, the processor adds the derived parameter-value-ascertaining orders to the batch. The processor then returns to placing step 84, thus beginning the next iteration of the iterative process.

In alternate embodiments, the processor executes a single algorithm implementing the functionality of both algorithm 80 and the trial algorithm.

Deriving the N-T Parameter-Value-Ascertaining Orders

Figure 6:
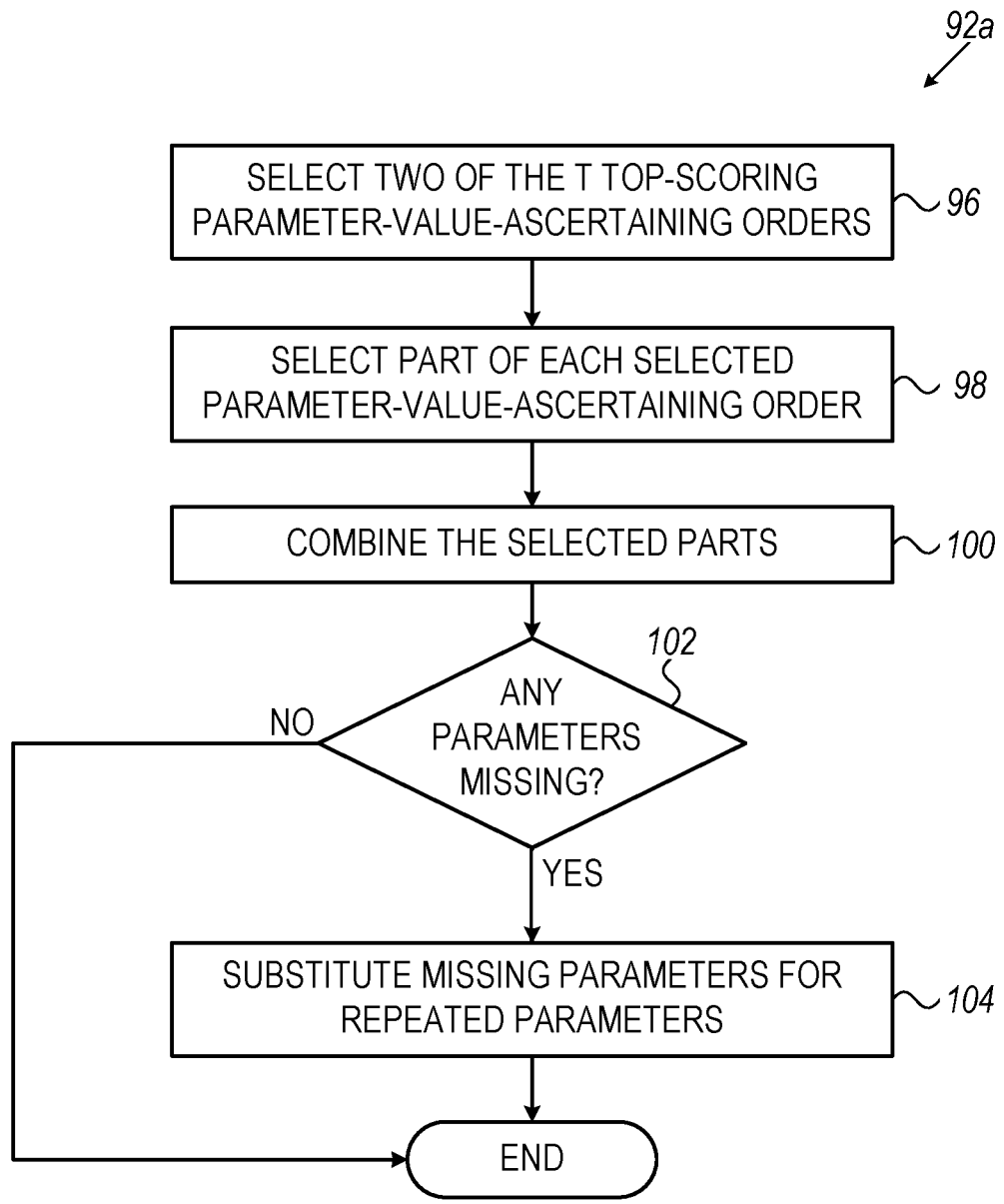
FIG. 6 is a flow diagram for an example algorithm for deriving a parameter-value-ascertaining order, in accordance with some embodiments of the present invention.

In some embodiments, at deriving step 92, at least one of the N-T parameter-value-ascertaining orders is derived by combining part of one of the T parameter-value-ascertaining orders with part of another one of the T parameter-value-ascertaining orders. In this regard, reference is now made to FIG. 6, which is a flow diagram for an example algorithm 92a for deriving a parameter-value-ascertaining order, in accordance with some embodiments of the present invention.

Algorithm 92a begins with a selecting step 96, at which the processor selects two of the T top-scoring parametervalue-ascertaining orders. Typically, the two parameter-value-ascertaining orders are selected at random.

Following the selection of the two parameter-value-ascertaining orders, the processor, at a part-selecting step 98, selects part of each selected parameter-value-ascertaining order, typically such that the total number of parameters in the selected parts is equal to the total number of parameters in a single parameter-value-ascertaining order. For example, using M to denote the number of parameters, the processor may select a suborder of size M/2 (or (M±1)/2, if M is odd) from each of the parameter-value-ascertaining orders. For example, given a first selected parameter-value-ascertaining order {P1, P2, P5, P3, P4} and a second selected parameter-value-ascertaining order {P2, P1, P4, P3, P5}, the processor may select {P1, P2, P5} from the first selected parameter-value-ascertaining order and {P3, P5} from the second selected parameter-value-ascertaining order.

Next, at a combining step 100, the processor combines the selected parts so as to compute a new parameter-value-ascertaining order. For example, continuing the example above, the processor may compute the parameter-value-ascertaining order {P1, P2, P5, P3, P5} by combining {P1, P2, P5} with {P3, P5}.

Subsequently, the processor, at a fifth checking step 102, checks whether any parameters are missing from the new parameter-value-ascertaining order. If yes, the processor, at a substituting step 104, substitutes the missing parameters for any repeated parameters. For example, continuing the example above, the processor may substitute P4 for one of the instances of P5 in the new parameter-value-ascertaining order, thus computing {P1, P2, P4, P3, P5} or {P1, P2, P5, P3, P4}. (The substituted instance of P5 may be chosen at random.) Subsequently, or if no parameters are missing, algorithm 92a ends.

Alternatively or additionally to combining parts of parameter-value-ascertaining orders, at least one of the N-T parameter-value-ascertaining orders may be derived by swapping respective positions of two of the parameters in one of the T parameter-value-ascertaining orders. (The two parameters are typically chosen at random.) For example, the parameter-value-ascertaining order {P1, P3, P5, P2, P4} may be computed by swapping the respective positions of P2 and P3 in {P1, P2, P5, P3, P4}.

It will be appreciated by persons skilled in the art that the present invention is not limited to what has been particularly shown and described hereinabove. Rather, the scope of embodiments of the present invention includes both combinations and subcombinations of the various features described hereinabove, as well as variations and modifications thereof that are not in the prior art, which would occur to persons skilled in the art upon reading the foregoing description. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A system, comprising:
a memory; and
one or more processors to cooperatively carry out a process that includes:
receiving a plurality of rules for processing packets arriving at at least one packet-processing device, the rules being based on multiple parameters associated with the packets,
causing the packet-processing device to process multiple subsets of the packets using different respective sequences of packet-processing instructions, which are stored in the memory and implement the rules via different respective parameter-value-ascertaining orders for ascertaining respective values of the parameters for each of the packets, by iteratively performing a subprocess that includes, during each $i^{th}$ iteration of the subprocess:
while the packet-processing device is using a first one of the sequences of packet-processing instructions $S_1^i$, writing a second one of the sequences of packet-processing instructions $S_2^i$ to the memory, and
subsequently to writing $S_2^i$ to the memory, causing the packet-processing device to use $S_2^i$ instead of $S_1^i$,
based on the processing of the subsets, computing respective scores for the sequences of packet-processing instructions,
based on the scores, selecting one of the sequences of packet-processing instructions, and
causing the packet-processing device to process the packets using the selected sequence of packet-processing instructions.

2. The system according to claim 1, wherein the one or more processors comprise at least one Data Processing Unit (DPU) to carry out at least part of the process.

3. The system according to claim 1, wherein at least one of the processors belongs to the packet-processing device.

4. The system according to claim 1, wherein the subprocess further includes, during each $i^{th}$ iteration of the subprocess:
comparing the score for $S_2^i$ to the score for $S_1^i$, and
based on the comparing, selecting either $S_1^i$ or $S_2^i$ as the first one of the sequences of packet-processing instructions, $S_1^{i+1}$, for a next iteration of the subprocess.

5. The system according to claim 1, wherein causing the packet-processing device to process the multiple subsets of the packets using the different respective sequences of packet-processing instructions includes causing the packet-processing device to process the multiple subsets of the packets using the different respective sequences of packet-processing instructions by:
initializing a batch of N of the parameter-value-ascertaining orders, and iteratively:
causing the packet-processing device to use N of the sequences of packet-processing instructions that implement the rules via the N parameter-value-ascertaining orders in the batch, respectively,
based on the respective scores for the N sequences of packet-processing instructions, removing, from the batch, all but T of the N parameter-value-ascertaining orders,
deriving N-T of the parameter-value-ascertaining orders from the T parameter-value-ascertaining orders remaining in the batch, and adding the derived parameter-value-ascertaining orders to the batch.

6. The system according to claim 5, wherein deriving the N-T parameter-value-ascertaining orders includes deriving at least one of the N-T parameter-value-ascertaining orders by combining part of a first one of the T parameter-value-ascertaining orders with another part of a second one of the T parameter-value-ascertaining orders.

7. The system according to claim 5, wherein deriving the N-T parameter-value-ascertaining orders includes deriving at least one of the N-T parameter-value-ascertaining orders by swapping respective positions of two of the parameters in one of the T parameter-value-ascertaining orders.

8. The system according to claim 1, wherein the score for each of the sequences of packet-processing instructions is based on a number of the packets processed per unit time using the sequence.

9. The system according to claim 1, wherein the score for each of the sequences of packet-processing instructions is based on an average number, per packet, of lookups in the sequence when using the sequence.

10. The system according to claim 1, wherein the score for each of the sequences of packet-processing instructions is based on an average number, per packet, of cache hits or cache misses when using the sequence.

11. The system according to claim 1, wherein the score for each of the sequences of packet-processing instructions is based on a number of memory entries that store the sequence.

12. A method, comprising:
receiving a plurality of rules for processing packets arriving at at least one packet-processing device, the rules being based on multiple parameters associated with the packets;
causing the packet-processing device to process multiple subsets of the packets using different respective sequences of packet-processing instructions, which implement the rules via different respective parameter-value-ascertaining orders for ascertaining respective values of the parameters for each of the packets;
based on the processing of the subsets, computing respective scores for the sequences of packet-processing instructions, wherein the score for each of the sequences is based on a number of the packets processed per unit time using the sequence;
based on the scores, selecting one of the sequences of packet-processing instructions; and
causing the packet-processing device to process the packets using the selected sequence of packet-processing instructions.

13. The method according to claim 12, wherein causing the packet-processing device to process the multiple subsets of the packets using the different respective sequences of packet-processing instructions comprises iteratively performing a process that includes, during each $i^{th}$ iteration of the process:
while the packet-processing device is using a first one of the sequences of packet-processing instructions $S_1^i$, which is stored in a memory of the packet-processing device, writing a second one of the sequences of packet-processing instructions $S_2^i$ to the memory, and subsequently to writing $S_2^i$ to the memory, causing the packet-processing device to use $S_2^i$ instead of $S_1^i$.

14. The method according to claim 13, wherein the process further includes, during each $i^{th}$ iteration of the process:
comparing the score for $S_2^i$ to the score for $S_1^i$, and based on the comparing, selecting either $S_1^i$ or $S_2^i$ as the first one of the sequences of packet-processing instructions, $S_1^{i+1}$, for a next iteration of the process.

15. The method according to claim 12, wherein causing the packet-processing device to process the multiple subsets of the packets using the different respective sequences of packet-processing instructions comprises causing the packet-processing device to process the multiple subsets of the packets using the different respective sequences of packet-processing instructions by:
initializing a batch of N of the parameter-value-ascertaining orders, and iteratively:
causing the packet-processing device to use N of the sequences of packet-processing instructions that implement the rules via the N parameter-value-ascertaining orders in the batch, respectively,
based on the respective scores for the N sequences of packet-processing instructions, removing, from the batch, all but T of the N parameter-value-ascertaining orders,
deriving N-T of the parameter-value-ascertaining orders from the T parameter-value-ascertaining orders remaining in the batch, and
adding the derived parameter-value-ascertaining orders to the batch.

16. The method according to claim 15, wherein deriving the N-T parameter-value-ascertaining orders comprises deriving at least one of the N-T parameter-value-ascertaining orders by combining part of a first one of the T parameter-value-ascertaining orders with another part of a second one of the T parameter-value-ascertaining orders.

17. The method according to claim 15, wherein deriving the N-T parameter-value-ascertaining orders comprises deriving at least one of the N-T parameter-value-ascertaining orders by swapping respective positions of two of the parameters in one of the T parameter-value-ascertaining orders.

18. The method according to claim 12, wherein the score for each of the sequences of packet-processing instructions is based on an average number, per packet, of lookups in the sequence when using the sequence.

19. The method according to claim 12, wherein the score for each of the sequences of packet-processing instructions is based on an average number, per packet, of cache hits or cache misses when using the sequence.

20. The method according to claim 12, wherein the score for each of the sequences of packet-processing instructions is based on a number of memory entries that store the sequence.

21. A system, comprising:
a memory; and
one or more processors to cooperatively carry out a process that includes:
receiving a plurality of rules for processing packets arriving at at least one packet-processing device, the rules being based on multiple parameters associated with the packets,
causing the packet-processing device to process multiple subsets of the packets using different respective sequences of packet-processing instructions, which are stored in the memory and implement the rules via different respective parameter-value-ascertaining orders for ascertaining respective values of the parameters for each of the packets,
based on the processing of the subsets, computing respective scores for the sequences of packet-processing instructions, wherein the score for each of the sequences is based on a number of the packets processed per unit time using the sequence,
based on the scores, selecting one of the sequences of packet-processing instructions, and
causing the packet-processing device to process the packets using the selected sequence of packet-processing instructions.

22. The system according to claim 21, wherein the one or more processors comprise at least one Data Processing Unit (DPU) to carry out at least part of the process.

23. The system according to claim 21, wherein at least one of the processors belongs to the packet-processing device.

24. The system according to claim 21, wherein causing the packet-processing device to process the multiple subsets of the packets using the different respective sequences of packet-processing instructions includes iteratively performing a subprocess that includes, during each $i^{th}$ iteration of the subprocess:
  while the packet-processing device is using a first one of the sequences of packet-processing instructions $S_1^i$, writing a second one of the sequences of packet-processing instructions $S_2^i$ to the memory,
  subsequently to writing $S_2^i$ to the memory, causing the packet-processing device to use $S_2^i$ instead of $S_1^i$,
  comparing the score for $S_2^i$ to the score for $S_1^i$, and
  based on the comparing, selecting either $S_1^i$ or $S_2^i$ as the first one of the sequences of packet-processing instructions, $S_1^{i+1}$, for a next iteration of the subprocess.

25. The system according to claim 21, wherein causing the packet-processing device to process the multiple subsets of the packets using the different respective sequences of packet-processing instructions includes causing the packet-processing device to process the multiple subsets of the packets using the different respective sequences of packet-processing instructions by:
  initializing a batch of N of the parameter-value-ascertaining orders, and iteratively:
    causing the packet-processing device to use N of the sequences of packet-processing instructions that implement the rules via the N parameter-value-ascertaining orders in the batch, respectively,
    based on the respective scores for the N sequences of packet-processing instructions, removing, from the batch, all but T of the N parameter-value-ascertaining orders,
    deriving N-T of the parameter-value-ascertaining orders from the T parameter-value-ascertaining orders remaining in the batch, and
    adding the derived parameter-value-ascertaining orders to the batch.

26. The system according to claim 25, wherein deriving the N-T parameter-value-ascertaining orders includes deriving at least one of the N-T parameter-value-ascertaining orders by combining part of a first one of the T parameter-value-ascertaining orders with another part of a second one of the T parameter-value-ascertaining orders.

27. The system according to claim 25, wherein deriving the N-T parameter-value-ascertaining orders includes deriving at least one of the N-T parameter-value-ascertaining orders by swapping respective positions of two of the parameters in one of the T parameter-value-ascertaining orders.

28. The system according to claim 21, wherein the score for each of the sequences of packet-processing instructions is based on an average number, per packet, of lookups in the sequence when using the sequence.

29. The system according to claim 21, wherein the score for each of the sequences of packet-processing instructions is based on an average number, per packet, of cache hits or cache misses when using the sequence.

30. The system according to claim 21, wherein the score for each of the sequences of packet-processing instructions is based on a number of memory entries that store the sequence.

* * * * *